United States Patent
Grigore et al.

(10) Patent No.: US 11,112,556 B2
(45) Date of Patent: Sep. 7, 2021

(54) EDGE-LIT LIGHTING FIXTURES

(71) Applicant: Nulite Lighting, Denver, CO (US)

(72) Inventors: Valerica Grigore, Longmont, CO (US); Brian Beck, Denver, CO (US); Patrick Hersco, Denver, CO (US)

(73) Assignee: Nulite Lighting, Denver, CO (US)

( * ) Notice: Subject to any disclaimer, the term of this patent is extended or adjusted under 35 U.S.C. 154(b) by 0 days.

(21) Appl. No.: 15/992,138

(22) Filed: May 29, 2018

(65) Prior Publication Data

US 2018/0341058 A1 Nov. 29, 2018

Related U.S. Application Data

(60) Provisional application No. 62/511,963, filed on May 27, 2017.

(51) Int. Cl.

| | |
|---|---|
| *F21V 8/00* | (2006.01) |
| *F21V 15/01* | (2006.01) |
| *F21V 17/04* | (2006.01) |
| *G02B 6/12* | (2006.01) |
| *F21V 15/015* | (2006.01) |
| *F21S 8/06* | (2006.01) |
| *F21Y 115/10* | (2016.01) |
| *F21Y 103/10* | (2016.01) |

(52) U.S. Cl.
CPC ............. *G02B 6/0073* (2013.01); *F21S 8/06* (2013.01); *F21V 15/01* (2013.01); *F21V 15/013* (2013.01); *F21V 15/015* (2013.01); *F21V 17/04* (2013.01); *G02B 6/009* (2013.01); *G02B 6/0078* (2013.01); *G02B 6/12004* (2013.01); *F21Y 2103/10* (2016.08); *F21Y 2115/10* (2016.08); *G02B 6/0091* (2013.01)

(58) Field of Classification Search
CPC ..... G02B 6/00–0095; G09F 2013/1804–1895; G09F 2013/222; F21V 2200/00–40
See application file for complete search history.

(56) References Cited

U.S. PATENT DOCUMENTS

| | | | | |
|---|---|---|---|---|
| 9,069,106 B1 * | 6/2015 | Blessitt | ............... | G02B 6/0073 |
| 10,067,284 B1 * | 9/2018 | DiFelice | .............. | G02B 6/0085 |
| 10,240,460 B2 * | 3/2019 | Thomas | .................. | F01D 5/188 |
| 10,571,616 B2 * | 2/2020 | Schenkl | .................. | F21V 15/01 |
| 2013/0336008 A1 * | 12/2013 | Kim | ...................... | G02B 6/0011 |
| | | | | 362/612 |

(Continued)

FOREIGN PATENT DOCUMENTS

| | | | | |
|---|---|---|---|---|
| CN | 104919242 A | * | 9/2015 | ............. F21S 8/026 |
| EP | 2416066 A2 | * | 2/2012 | .......... F21V 33/0012 |

(Continued)

*Primary Examiner* — Mariceli Santiago
(74) *Attorney, Agent, or Firm* — Starfort IP; John T Henri

(57) ABSTRACT

Edge-lit lighting systems employing a light module for mounting a LED light source with ease of installation and removal on fixtures are described where the frame for the lighting system bears an internal skeletal pre-load bar to keep the frame planar. Multiple frames may be combined with alignment plates and joining hardware and a suspension system that gives the fixtures stability, strength and great functional advantages when used in various forms of architectural lighting.

3 Claims, 14 Drawing Sheets

(56) References Cited

U.S. PATENT DOCUMENTS

| | | | | |
|---|---|---|---|---|
| 2015/0377464 A1* | 12/2015 | Ju | ........................ | G02B 6/0075 |
| | | | | 362/612 |
| 2015/0378081 A1* | 12/2015 | Blessitt | ................ | G02B 6/0073 |
| | | | | 362/612 |
| 2016/0147009 A1* | 5/2016 | Ju | ........................ | G02B 6/0085 |
| | | | | 362/613 |
| 2018/0231710 A1* | 8/2018 | Snijkers | ................ | F21V 19/005 |

FOREIGN PATENT DOCUMENTS

| | | | | | |
|---|---|---|---|---|---|
| EP | 2765354 | A1 * | 8/2014 | .............. | F21S 8/061 |
| KR | 101079750 | B1 * | 11/2011 | .......... | G02B 6/0011 |
| KR | 102221384 | B1 * | 3/2021 | | |
| KR | 102242593 | B1 * | 4/2021 | | |
| WO | WO-2011004984 | A2 * | 1/2011 | ........... | E04B 9/0428 |
| WO | WO-2014069791 | A1 * | 5/2014 | | |
| WO | WO-2017214888 | A1 * | 12/2017 | ............. | H05B 47/10 |

* cited by examiner

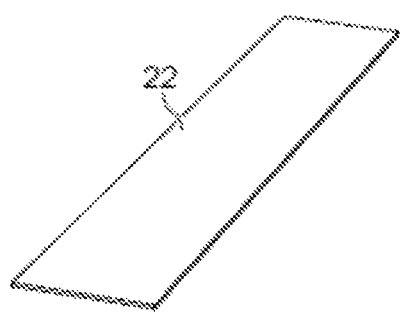
FIG. 27
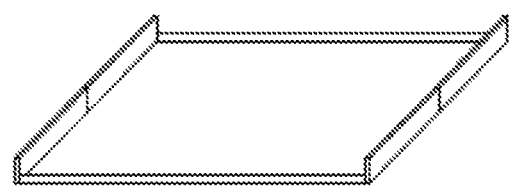
FIG. 28
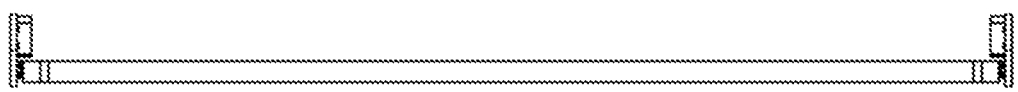
FIG. 29
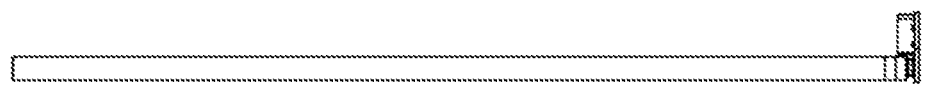
FIG. 29-A

EDGE-LIT LIGHTING FIXTURES

RELATED APPLICATIONS

This application claims the benefit of U.S. Provisional application No. 62/511,963 titled "Edge-lit Lighting Fixtures" filed 27 May 2017 which is incorporated herein by reference.

BACKGROUND

An edge-lit luminaire generally has an edge-lit light guide (or sometimes referred to as waveguide or a light emitting panel). Typically, light from one or more light sources (e.g., one or more light emitting diodes (LEDs)) enters the light guide through a narrow edge/side of the light guide. For example, the light sources may be positioned close to the narrow edge of the light guide. A portion of the light that enters the light guide is typically emitted through at least one broad side of the light guide.

In some situations, a single panel edge-lit luminaire may not be feasible for long rows of luminaires. Installing multiple standalone luminaires may not be practical in all situations. For example, space may not be available to accommodate installation of multiple standalone luminaires. Further, installation of multiple standalone luminaires may be relatively expensive and time consuming. Therefore, multiple edge-lit panels may be needed to reduce the installation labor costs.

DESCRIPTION

The present disclosure relates generally to lighting solutions, and more particularly to edge-lit light fixtures. In an example embodiment, an edge-lit light fixture includes a single edge-lit light guide panel. In another example embodiment, an edge-lit fixture includes more than one edge-lit panel as shown in FIG. 1 with a row of edge-lit light fixtures, with a first side cover, at the non-power feed start of the row, at least two fixture segments joined with latches and suspended and a last side cover, at the power feed end of the row.

In one embodiment a multiple light guide fixture segment consists of an edge-lit light fixture segment, having a frame with at least one cutout, a light guide panel positioned above a cutout, bordering the light guide panel along its plane is a LED light source on a light module (shown in FIGS. 25 and 26), a LED positioning spring device, an insulating surface and power supply along a pair of opposite sides of the cutout and an internal supporting preload bar inserted along the length of the cavity of parallel sides of the frame (shown in FIG. 17). The fixture is joined to one or more fixtures and all are aligned using joiner plates a latch spring system for securing them. The latching system shown in FIGS. 7, 10, 32,33, 34 are used to join and secure fixture components.

Latches and joiner plates employed in the fixture provide quick connect/disconnects, provide flexibility when incidental forces are applied to the row of fixtures. Permanent damage to a row joining system is avoided and the row can be straightened again. The overcam latch provides a secure lock when linear forces are applied to the fixture segments.

In one embodiment a fixture with single light guide fixture segment seen FIGS. 4 and 5 is described having one cutout with a light guide panel positioned above a first cutout.

The fixture segment is the same construction, no matter if installed at the beginning of the row, middle or end.

In one embodiment seen in FIGS. 15, 16 & 17, a fixture frame segment consists of a fixture frame at least 6' to 8' long where a preload bar in the form of a c-channel with a cross section is inserted into the frame cavity preventing sagging or bending of the fixture with an extended length.

The arched pre-formed bar inserted in the fixture frame as depicted in FIGS. 16 and 17, raises the middle of the frame with a force equal to the weight of the fixture that would otherwise bow the frame in the middle.

In one embodiment the pre-load bar is also used for wire way routing.

A light module used in LED lighting is also described in different embodiments.

The spring loaded light module has a light source holder rail bearing surface holes for fasteners; one or more LED boards to fit along the side of the light source holder rail, one or more insulator strips inserted between the rail surface and the LED board to insulate the rail from electrical energy from the LED board, and two or more springs to firmly and securely hold and align the LEDs against the edge of a wave guide as it moves due to thermal expansion or mechanical movement. The spring loaded light module is easily detachable from a light fixture frame via screw, clip or latch fastener. The module is electrically connected in series or parallel to other modules. FIGS. 18 to 31 show a spring loaded light module with a light source holder rail, one or more LED boards, one or more insulator strips and two or more springs.

This design enables heatsink for light sources, mounting multiple light sources to one module keeps the light source against the light guide at a pre-determined distance, independent of the light guide thermal expansion (using springs), allow field maintenance of the light source with installation and assembly is simplified. This feature enables heatsink for light sources, mounting multiple light sources to one module keeps the light source against the light guide at a pre-determined distance, independent of the light guide thermal expansion (using springs), allow field maintenance of the light source with installation and assembly is simplified.

In another embodiment, the light fixture bears a spring loaded light module seen in FIGS. 18 to 31) which has a light source holder rail (213), one or more LED boards (211), one or more insulator strips (214) and two or more springs (212). The light module allows the mounting of multiple light sources to one module, keeps the light source against the light guide at a pre-determined distance, independent of the light guide thermal expansion (using springs), allows field maintenance of the light source.

Light modules are used in various embodiments of the claims. In one embodiment, a light module is a novel spring loaded light module bearing a light source holder rail or frame bearing surface holes for fasteners. The rail or frame is designed for one or more LED boards to fit along the side of the light source holder rail or frame structure. When the rail is metal it may need an insulation strip before electrical components are mounted to it. One or more insulator strips inserted between the rail surface and then LED board mounted along its length. The light module is then positioned on a light fixture by positioning devices such as springs, clips, glue, solder, magnets or like attaching and fastening means. The Light module gas two or more springs to firmly and securely hold and align the LEDs against the edge of a wave guide as it moves due to thermal expansion or mechanical movement. The spring loaded light module is easily detachable from a light fixture frame via screw, clip or latch fastener. The spring loaded light module may be connected in series or parallel to other modules.

In another embodiment a suspension system for a light fixture is described as seen FIGS. 2 and 3. In one embodiment, the suspension system has a power feed suspension cord to suspend a fixture at one end, a non-power feed cord to suspend a fixture at another end, a rigid cylinder imparting rigidity to the lower half of the power feed and non-power feed suspension cords bearing threads for screw on connection to the frame of the light fixture. The rigid extension tube, above the mounting base of the suspension cylinder (51) is of a specific height as to allow self balancing of the fixture.

The aircraft cable (52) wire is hidden under the transversal cover, thus making the suspension system a clean looking aesthetical system.

Other embodiments of the lighting fixture is joining and latching system devices shown in FIGS. 10,11,12,7,8,9,32,33,34. The two-piece alignment plates are intended to compensate for the tolerance of the extruded frame making a dynamic connection between the two fixture segments in a row. At the end of a row, they help connect the last fixture segment with the deco end cap with latches that is the carrier of the suspension point.

The two-piece joiner plates may be manufactured in one piece as seen in FIG. 41 which is cleaved to yield two joiner plates. The joiner plate provides flexible alignment seen in FIG. 12 in conjunction with the latch spring system.

In one embodiment the latching system shown in FIGS. 7, 10, 32,33, 34 is used to join and secure fixture components.

Latches and joiner plates employed in the fixture provide quick connect/disconnects, provide flexibility when incidental forces are applied to the row of fixtures. Permanent damage to a row joining system is avoided and the row can be straightened again. The overcam latch provides a secure lock when linear forces are applied to the fixture segments.

In one embodiment, a wireway management system shown in FIG. 38 is used. The wire components comprise of (9) suspension ready transversal bracket, (243) cord mounting bracket, (246) quick wire connectors, (27) transversal end cover, (39) pre-formed bar, (38) mid transversal cover, (26) longitudinal cover. They allow wire routing and access to the electrical wire and electrical enclosure.

In one embodiment, the edge-lit optical system bears a side cover assembly, at the non-power feed side seen in FIG. 7 which may have a angular or rounded or other shapes and a side cover assembly, at the power feed side, seen in FIG. 9. The side cover is the same at both ends of the row. The power feed side subassembly becomes different from the non-power feed side sub-assembly by installing one or the other end brackets of the fixture segment.

In one embodiment, the frame bears hardware for suspension and power feed cable for the fixture at the ends of the frame without employing a side cover. The waveguide edges are covered on the sides of the frame bearing no light module or side cover.

In one embodiment, the edge-lit optical system uses LED boards disposed at opposite edges of a waveguide as seen in FIG. 29. In another embodiment, the edge-lit optical system uses LED boards disposed at one of the edges seen FIG. 29-A.

In one embodiment, the light fixture comprises a frame to enclose the edges of and support a planar light guide, bearing at least a light source such as a LED strip along its inner frame aligned with the plane of the planar light guide, bearing a power supply for the light source, the outer edges of said frame designed to interface and be joined to other frames via connectors to form a plurality of frames aligned along a plane.

In one embodiment, the light fixture comprises a frame to enclose the edges of and support a planar light guide, bearing at least a light source such as a LED strip along its inner frame aligned with the plane of the planar light guide, bearing a power supply for the light source, the outer edges designed to interface and be joined to other frames via connectors to form a plurality of frames aligned along a plane and a brace along one or more edges to keep said plurality of frames aligned linearly.

In one embodiment, the light fixture comprises a frame suspended by cables. In another embodiment one or more of the chords convey a power supply for the light fixture.

In one embodiment, the light fixture comprises a frame that encloses one or more rectangular, square, triangular, polygonal and like light guides. The frame may be bound on one or more sides by hollow channels open like c-channels or like cross section or enclosed that are circular, square, triangular or polygonal in cross section. The side frame of the channel may be braced internally with a skeletal pre-load bar that may be straight or arched to keep the surface of the frame planar and free of dips, bends and like distortions undesirable to light fixtures.

In one embodiment of the claims a frame is a structure on which components of the light fixture are mounted directly or indirectly made from steel, aluminum, natural or synthetic polymers and man made materials such as carbon fiber. A frame may have one or more cutouts that are triangular, square, rectangular, pentagonal or other polygonal shape. The cutouts may have one or more LEDs along one or more of the sides of the cutouts to form an edge lit light fixture segment or standalone fixture.

Fasteners and fastening means used in the light fixtures may be nuts and bolts, screws, hooks, latches, glue, solders, welds, springs with hooks, rivets, cables, zip ties, nails and like means used to secure and fasten components in the art.

In one embodiment, the fastening means are part of a frame such as a loop on a bracket, a frame, cable and like.

Brackets are employed in various embodiments to join, space and orient components of the edge lit fixtures and fixture segments bearing holes for nuts and bolts or screws and latches to quickly connect the parts of the fixtures.

In one embodiment of the claims, the components of a fixture having one or more segments is assembled using the various fasteners and parts mentioned herein manually.

In another embodiment, the components many be assembled by a robot. In other embodiments one or more components may be fabricated by 3D printing.

LEDs used in the fixtures are of different types and may be purchased from commercial sources.

An optical waveguide mixes and directs light emitted by one or more light sources, such as one or more light emitting diodes (LEDs). A typical example of an optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

In one embodiment, the light fixture comprises of frames connected via latches and alignment plates that enable easy joining and disengaging of the frames in the fixture for assembly, servicing or replacement of components of the fixture while firmly connecting a plurality of frames in a linear fashion.

In one embodiment, the light fixture comprises a frame that has one or more windows to fit one or more wave guides.

In one embodiment, the light fixture comprises a frame with a wave guide made of optical grade acrylic.

In one embodiment, the light fixture comprises a frame bearing one or more brackets for suspension of the light fixture to illuminate a space.

In one embodiment, the light fixture comprises a frame that bears connection at one or more ends for a wire way to convey power and control elements for the fixture.

Components of a light module are shown in FIGS. 18, 19, 20, 21.

Assembly of light module shown in FIGS. 22-26.

Optical guide shown in FIGS. 27-29a.

Figure 30:
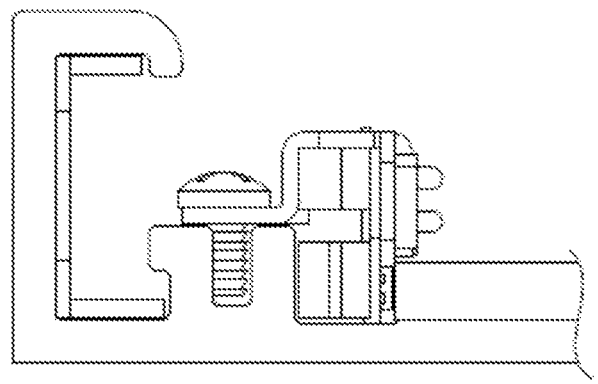
Figure 31:
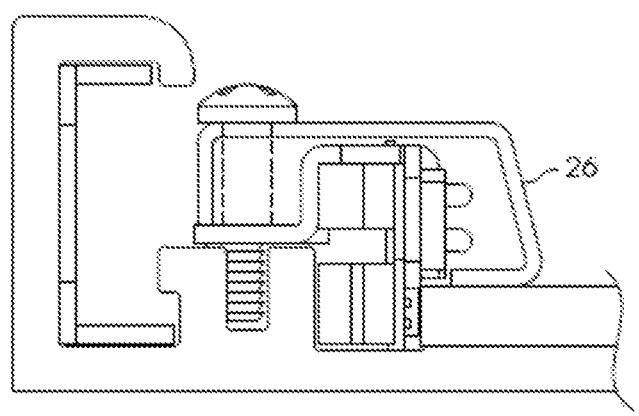

FIG. 30 shows an installed light module without the cover and with cover in FIG. 31.

Figure 32:
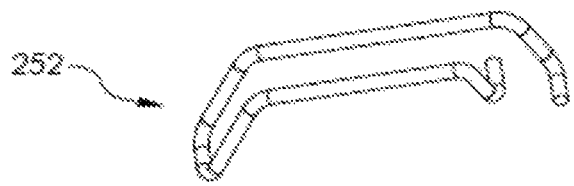
Figure 33:
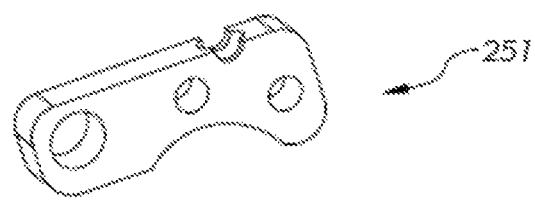
Figure 34:
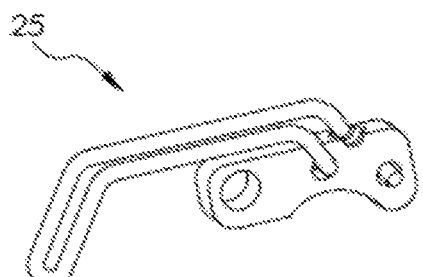

FIG. 32-34 shows latch and handles.

Figure 35:
Figure 36:
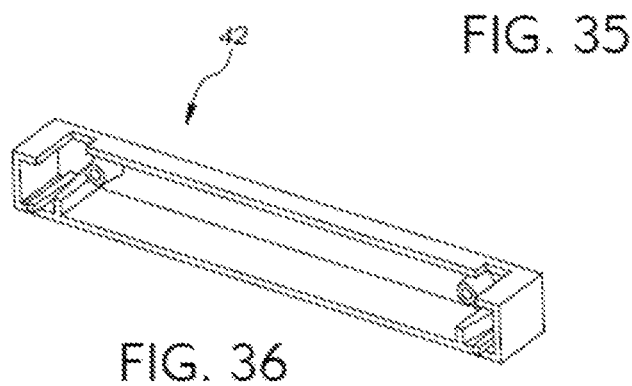

FIG. 35, 36 show end caps.

Figure 37:
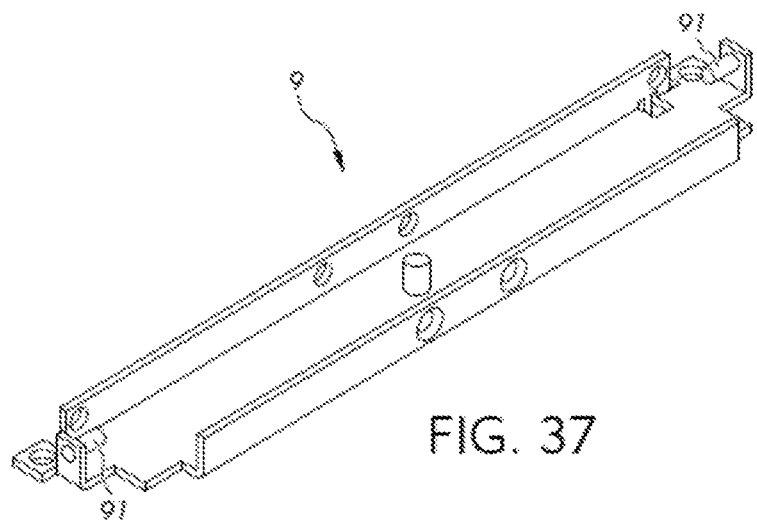

FIG. 37 shows a bracket for suspension.

Figure 38:
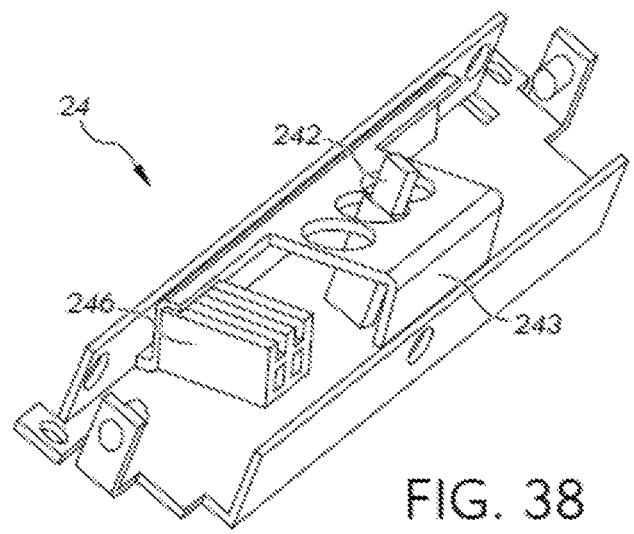

FIG. 38 shows a modular wireway.

Figure 39:
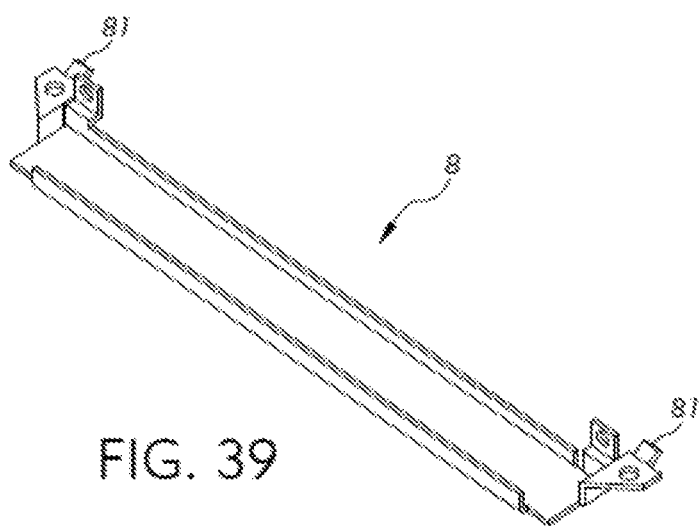

FIG. 39 shows a traversal bridge bracket with hooks.

Figure 40:
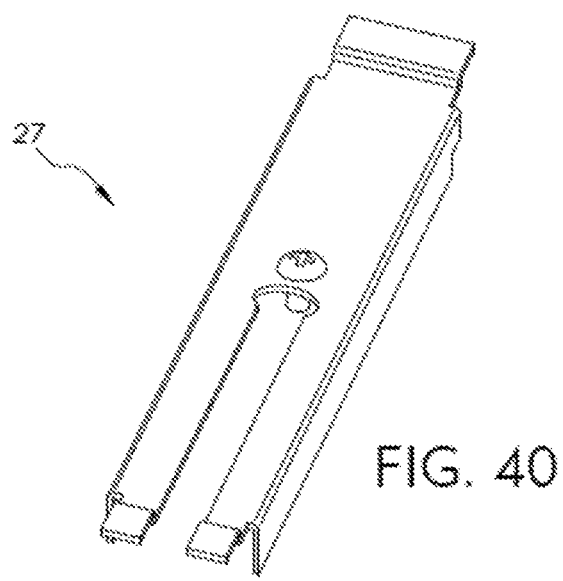

FIG. 40 shows a traversal end cover with captive screw.

Figure 41:
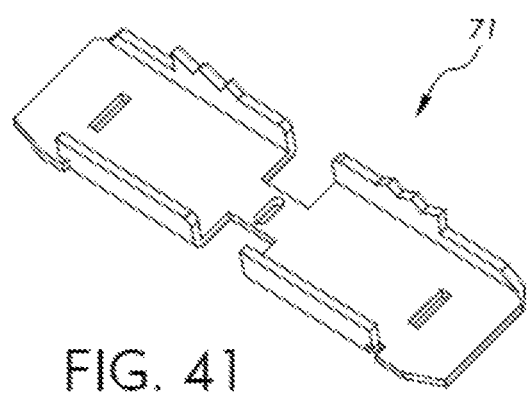

FIG. 41 shows alignment plates.

Figure 1:
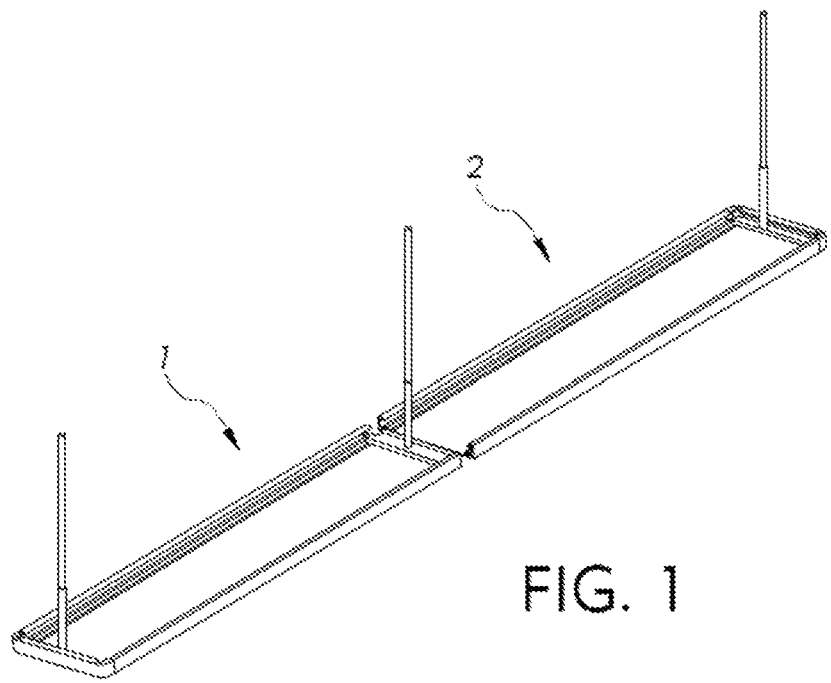
FIG. 1 shows a row of edge-lit light fixtures with a first side cover, at the non-power feed start of the row with at least two fixture segments joined with latches and suspended by a side cover and the power feed end of the row.
Figure 2:
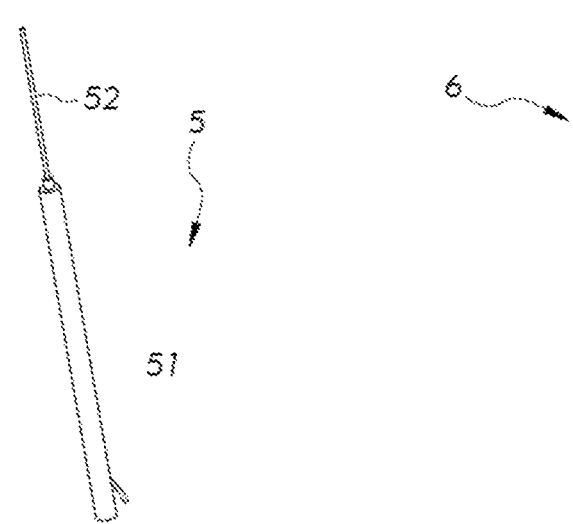
FIGS. 2, 3 show suspension systems.
Figure 3:
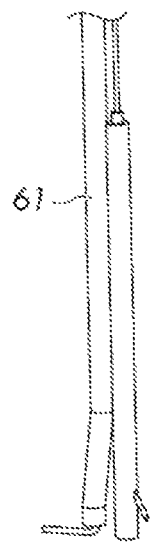
Figure 4:
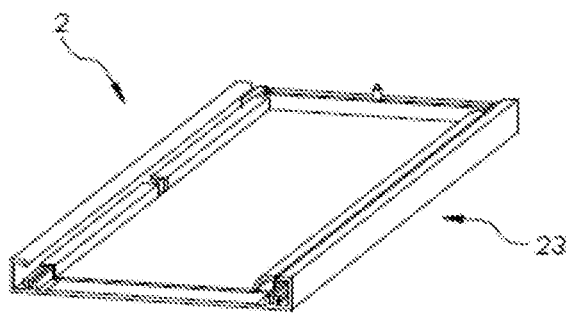
FIGS. 4, 5, show fixture segment with one light guide each.
Figure 5:
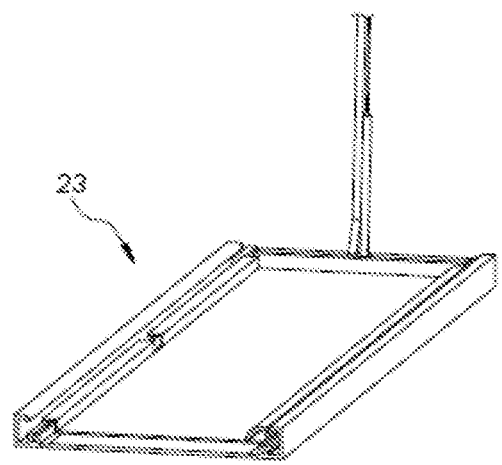
Figure 6:
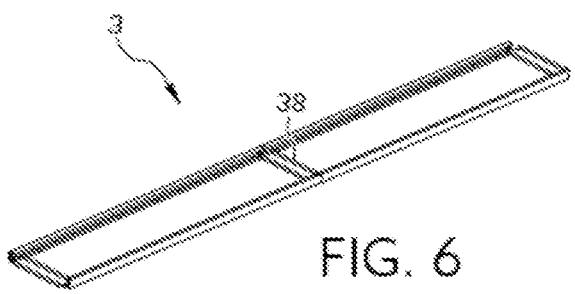
FIG. 6 shows a fixture segment with two light guides.
Figure 7:
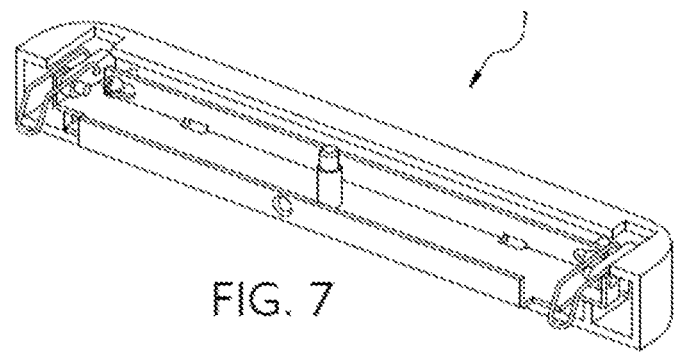
FIGS. 7, 8 show end caps without power feed.
Figure 8:
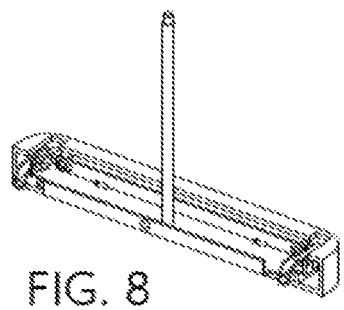
Figure 9:
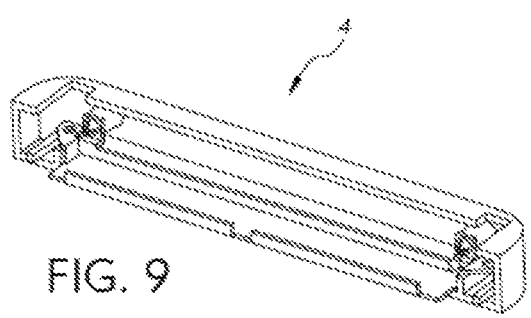
FIG. 9 shows an end cap for power feed side.
Figure 10:
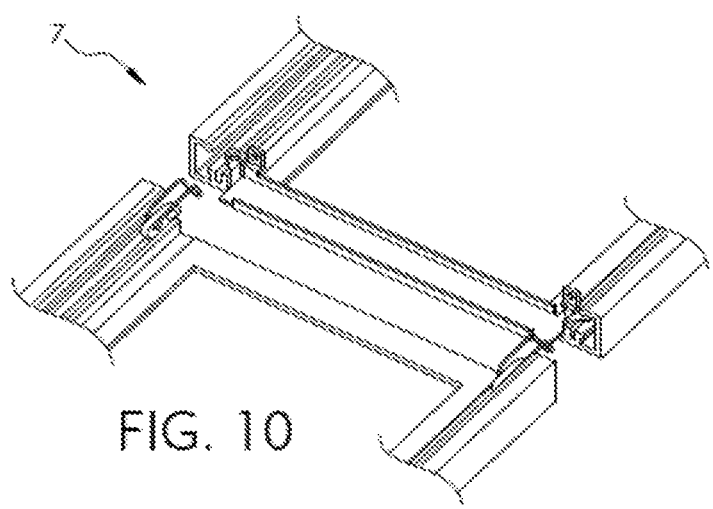
FIG. 10 shows joining fixtures with over cam latches.
Figure 11:
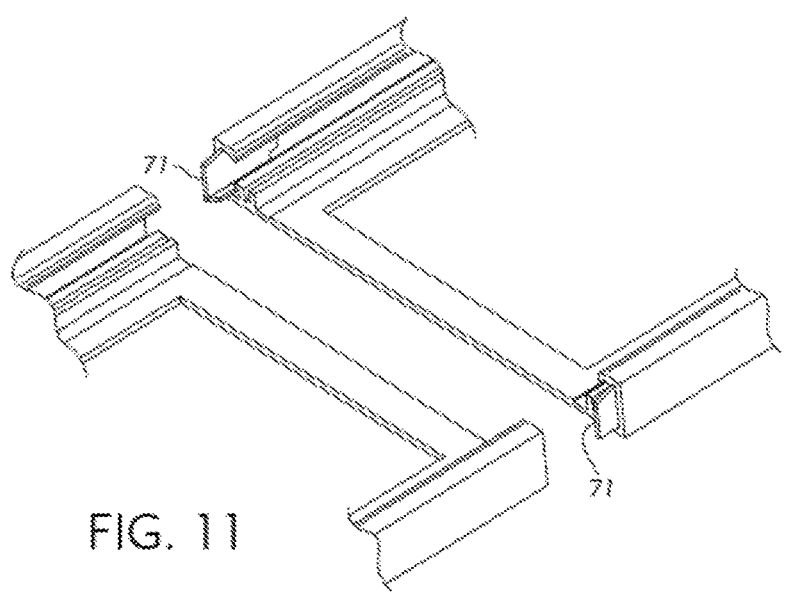
FIG. 11 shows row alignment of light frames.
Figure 12:
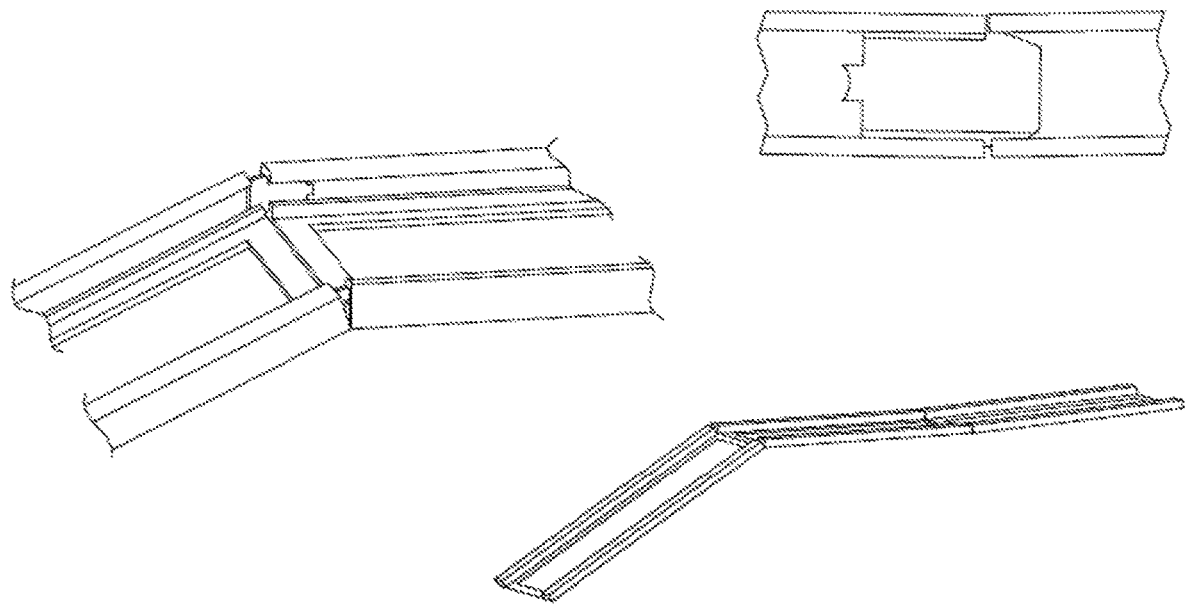
FIG. 12 shows flexible alignment of frames.
Figure 13:
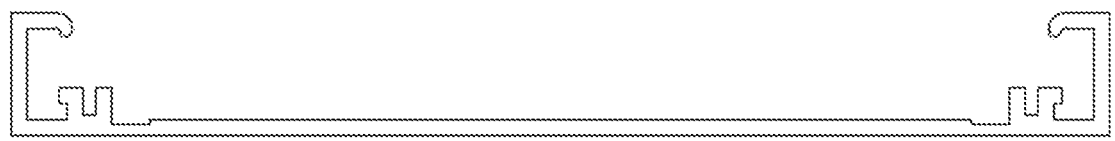
FIGS. 13, 14 show extruded frame with two windows.
Figure 14:
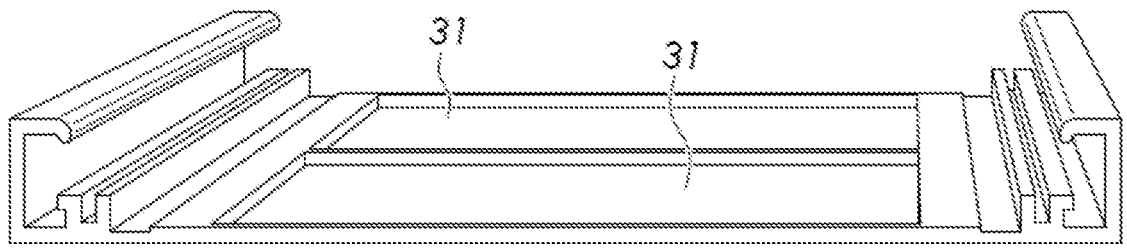
Figure 15:
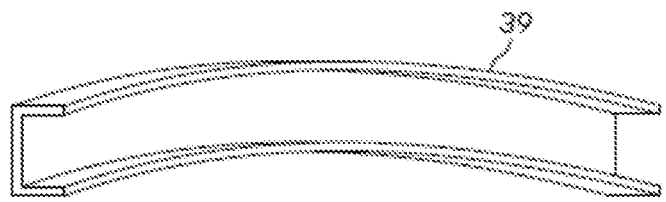
FIGS. 15, 16, 17 show frame with pre-bent bar.
Figure 16:
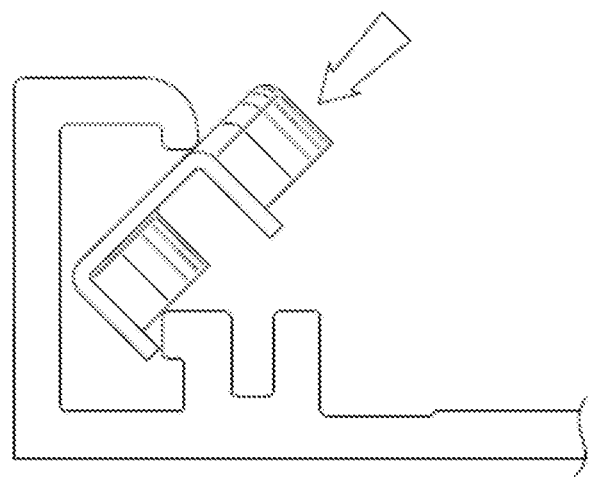
Figure 17:
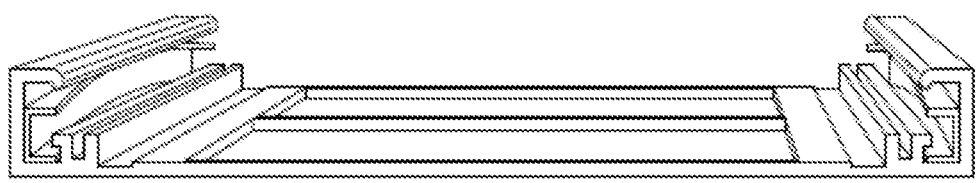
Figure 18:
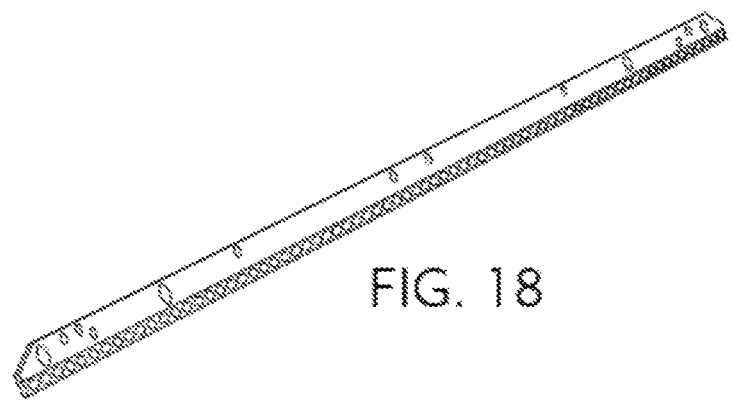
Figure 19:
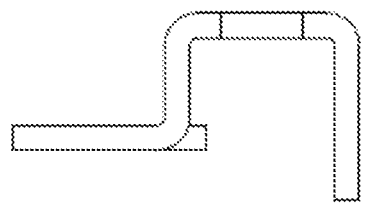
Figure 20:
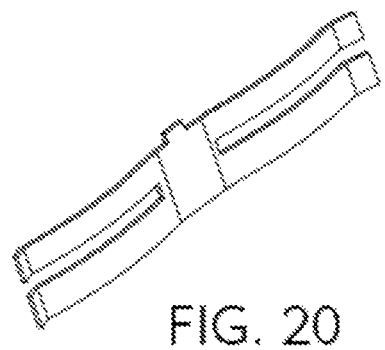
Figure 21:
Figure 24:
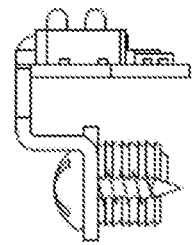
Figure 25:
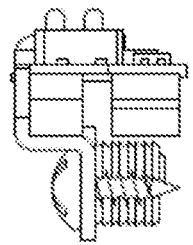
Figure 23:
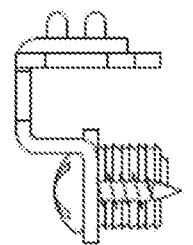
Figure 22:
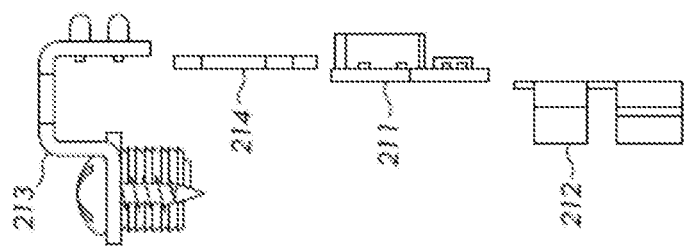
Figure 26:
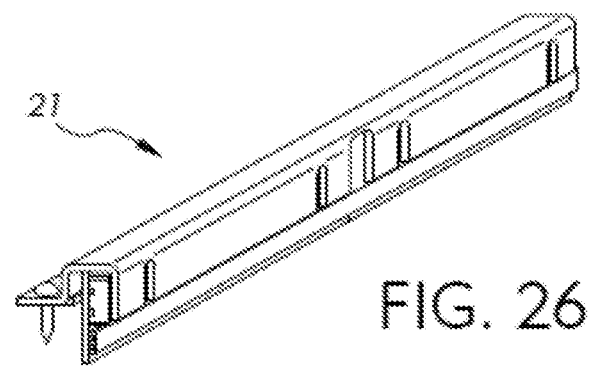

FIGS. 15.16.17 show a fixture frame segment a fixture frame at least 6' to 8' long with a preload bar.

FIGS. 18 to 31 show a spring loaded light module with a light source holder rail, one or more LED boards, one or more insulator strips and two or more springs.

This design enables heatsink for light sources, mounting multiple light sources to one module keeps the light source against the light guide at a pre-determined distance, independent of the light guide thermal expansion (using springs), allow field maintenance of the light source with installation and assembly is simplified. This feature enables heatsink for light sources, mounting multiple light sources to one module keeps the light source against the light guide at a pre-determined distance, independent of the light guide thermal expansion (using springs), allow field maintenance of the light source with installation and assembly is simplified.

What is claimed is:

1. A edge-lit lighting fixture with a spring loaded light module comprising:
a frame having at least one cutout, a light guide panel positioned above said cutout, an end bracket at one end of the frame for suspending the fixture and housing a power feed, another end bracket, at the opposite end of the frame, where one end of the frame can be joined to a second fixture segment via at least one latch and row alignment plates inserted within the ends of adjoining frames. a first side cover equipped with a bracket with fasteners, at the non-power feed start of the row, at least two fixture segments joined with latches, a last side cover equipped with a bracket with fasteners, at the power feed end of the row, at least one internal supporting preload bar inserted along the length of the cavity of parallel sides of the frame to keep it from bending where the preload bar is a c-channel in a cross section to be inserted into the frame cavity,
a spring-loaded light module with light source holder rail bearing surface holes for fasteners;
one or more LED boards to fit along the side of the light source holder rail;
one or more insulator strips inserted between the rail surface and the LED board to insulate the rail from electrical energy from the LED board; and,
two or more springs to firmly and securely hold and align the LEDs against the edge of a wave guide at a specific and maintained distance independently as it moves due to thermal expansion or mechanical movement.

2. The edge-lit lighting fixture of claim 1 where the module is easily detachable from a light fixture frame via screw, clip or latch fastener.

3. The edge-lit lighting fixture of claim 1 where the module is electrically connected in series or parallel to other modules.

* * * * *